(12) United States Patent
Lin et al.

(10) Patent No.: US 12,227,460 B1
(45) Date of Patent: Feb. 18, 2025

(54) LOW CARBON ULTRA-HIGH PERFORMANCE ENGINEERED GEOPOLYMER COMPOSITE AND ITS PREPARATION METHOD AND APPLICATION

(71) Applicant: GUANGDONG UNIVERSITY OF TECHNOLOGY, Guangzhou (CN)

(72) Inventors: Jiaxiang Lin, Guangzhou (CN); Gai Chen, Guangzhou (CN); Huaming Lai, Guangzhou (CN); Yongchang Guo, Guangzhou (CN); Hongshu Pan, Guangzhou (CN); Ruihao Luo, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/679,494

(22) Filed: May 31, 2024

(30) Foreign Application Priority Data

Aug. 7, 2023 (CN) .......................... 202310982064.5

(51) Int. Cl.
| | | |
|---|---|---|
| *C04B 28/26* | (2006.01) | |
| *C04B 14/06* | (2006.01) | |
| *C04B 14/28* | (2006.01) | |
| *C04B 16/06* | (2006.01) | |
| *C04B 18/08* | (2006.01) | |
| *C04B 18/14* | (2006.01) | |
| *C04B 22/06* | (2006.01) | |
| *C04B 22/10* | (2006.01) | |
| *C04B 22/12* | (2006.01) | |
| *C04B 40/00* | (2006.01) | |
| *C04B 103/10* | (2006.01) | |
| *C04B 103/30* | (2006.01) | |
| *C04B 103/50* | (2006.01) | |

(52) U.S. Cl.
CPC .............. *C04B 28/26* (2013.01); *C04B 14/06* (2013.01); *C04B 14/28* (2013.01); *C04B 16/0625* (2013.01); *C04B 18/08* (2013.01); *C04B 18/141* (2013.01); *C04B 18/146* (2013.01); *C04B 22/062* (2013.01); *C04B 22/10* (2013.01); *C04B 22/124* (2013.01); *C04B 40/0046* (2013.01); *C04B 2103/10* (2013.01); *C04B 2103/302* (2013.01); *C04B 2103/50* (2013.01); *C04B 2201/50* (2013.01)

(58) Field of Classification Search
CPC ......... C04B 28/26; C04B 14/06; C04B 14/28; C04B 16/0625; C04B 18/08; C04B 18/141; C04B 18/146; C04B 22/062; C04B 22/10; C04B 22/124; C04B 40/0046
USPC .............................................. 524/8
See application file for complete search history.

(56) References Cited

U.S. PATENT DOCUMENTS

2016/0046527 A1* 2/2016 Feng ................... C04B 16/0625
106/713

FOREIGN PATENT DOCUMENTS

CN 113800829 A 12/2021

OTHER PUBLICATIONS

N Li, Z Zhang, C Shi*, and J Zhang; Some Progresses in the Challenges for Geopolymer; Journal; Nov. 15, 2018; pp. 1-10; vol. 431, Issue 2 ; IOP Publishing Ltd; Kuala Lumpur, Malaysia.
Ning Li, Caijun Shi, Zuhua Zhang, Deju Zhu, Hyeon-Jong Hwang, Yuhan Zhu, Tengjiao Sun; A mixture proportioning method for the development of performance-based alkali-activated slag-based concrete; Journal; Oct. 2018; pp. 163-174; vol. 93; Elsevier.

* cited by examiner

*Primary Examiner* — Hannah J Pak

(57) ABSTRACT

The present invention discloses a low carbon ultra-high performance engineered geopolymer composite and its preparation method and application, which belongs to the technical field of building materials, an activator used therein is a $NaOH$—$Na_2SiO_3$ activator as a basic activator, and $Na_2CO_3$ is used as a supplementary activator to form a low carbon composite activator. The preparation method comprises the following steps: (1) after mixing uniformly the cementitious material powder, barium chloride, and defoaming agent, adding successively quartz sand, activator, water reducer, nano calcium carbonate and PE fiber and stirring uniformly to obtain a slurry; (2) pouring and forming the obtained slurry and maintaining, then obtaining the low carbon ultra-high performance engineered geopolymer composite. The composite provided by the present invention has high performance of low carbon, ultra-high compressive strength, ultra-high tensile ductility and long setting time, which provides a new idea for the preparation of building materials.

4 Claims, 9 Drawing Sheets

LOW CARBON ULTRA-HIGH PERFORMANCE ENGINEERED GEOPOLYMER COMPOSITE AND ITS PREPARATION METHOD AND APPLICATION

TECHNICAL FIELD

The present invention belongs to the technical field of building materials, in particular to a low carbon ultra-high performance engineered geopolymer composite and its preparation method and application.

BACKGROUND ART

With the progress of the social development concept, the engineering structure design puts forward higher requirements for lightweight, service life, and space utilization, so the requirements for the mechanical properties and durability of building materials are continuously improved. To meet social needs, some typical high performance concrete materials are proposed: ultra-high compressive strength (≥120 MPa), high durability, high toughness ultra-high performance concrete (UHPC), and engineered cementitious composite (ECC) with excellent deformability and crack control capability. However, the production of high performance concrete materials such as UHPC and ECC requires the consumption of large amounts of cement. The cement industry is currently considered one of the major sources of carbon emissions, producing 0.81 tons of $CO_2$ per ton of cement produced, so there is a need to improve the sustainability of current high performance concrete materials.

Geopolymer is considered to be a sustainable new type of gel, and the carbon emission of geopolymer concrete (GPC) produced using it is only 9-80% of that of cement concrete. At present, there are also some studies on the preparation for high performance concrete using geopolymers, and ultra-high performance geopolymer concrete (UHPGC)/engineered geopolymer composite (EGC) with similar mechanical properties to UHPC/ECC is proposed. However, although geopolymer concrete is considered to be a sustainable alternative to cement concrete, the substantial increase in carbon emissions caused by its high performance cannot be ignored.

In the prior art, $NaOH$—$Na_2SiO_3$ activator with higher excitation efficiency is generally used in high-performance geopolymer concrete, but the carbon emission produced by $NaOH$—$Na_2SiO_3$ activator accounts for more than 80% of the total carbon emission of geopolymer concrete, so there is still a huge room for improvement in the sustainability of geopolymer concrete. In addition, although UHPGC has ultra-high mechanical properties, it also has the disadvantage of insufficient deformability and crack control capability, and the internal steel fibers are easily attacked by corrosive media to weaken the mechanical properties when working with cracks. Similarly, although EGC has excellent deformability and crack control capability, which can effectively improve the durability and seismic performance of engineering structures, its compression resistance is relatively poor. Furthermore, high-performance geopolymer concrete usually has a low water-binder ratio, which results in high alkalinity in the system, and a large amount of slag is usually used to obtain better mechanical properties, and the setting time of the high-performance geopolymer concrete is relatively short, and flash coagulation easily occurs, which hinders its engineering application.

Therefore, how to use an alkaline activator with lower carbon emissions to produce geopolymer concrete, and how to produce high-performance geopolymer concrete with ultra-high compressive strength, ultra-high tensile ductility and long setting time are technical problems that need to be solved urgently by technicians in this field.

SUMMARY

In order to solve the above technical problems, the present invention proposes a low carbon ultra-high performance engineered geopolymer composite and its preparation method and application.

In order to achieve the above objective, the present invention provides the following technical solutions:

a low carbon ultra-high performance engineered geopolymer composite, an activator used therein is a $NaOH$—$Na_2SiO_3$ activator as a basic activator, and $Na_2CO_3$ is used as a supplementary activator to form a low carbon composite activator, wherein, a mass ratio of NaOH solution, $Na_2SiO_3$ solution, and $Na_2CO_3$ solution is (74.6-111.5):(0-119.1):(278.7-433.5).

Preferably, comprising the following parts by weight of raw materials:
cementitious material powder 1163 parts, fine aggregate 407.1 parts, admixture 18.6 parts, nano calcium carbonate 23.3 parts, reinforcing fiber 19.4 parts, activator 475.9-932.2 parts, and water 49.7-81.6 parts.

Wherein, a mass ratio of an equivalent $Na_2O$ in the activator to the cementitious material powder is 7%;
an equivalent $Na_2O$ mass is equivalent to a $Na_2O$ mass of each chemical component in the activator according to a mass fraction of sodium element.

A mass ratio of a total mass of a solvent and water in the activator to a mass of the cementitious material powder is 0.3.

Preferably, the cementitious material powder comprises the following parts by weight of raw materials: slag 821.1 parts, fly ash 248.9 parts, and silica fume 93.0 parts.

Preferably, the admixture comprises the following parts by weight of raw materials: barium chloride 11.6 parts, defoaming agent 1.2 parts, water reducer 5.8 parts;
the water reducer is sodium lignosulfonate.

Preferably, the fine aggregate is quartz sand, comprising fine sand and medium sand;
wherein, the fine sand and medium sand are 346.0 parts and 61.1 parts respectively;
the fine sand particle size is 40-200 μm, and the medium sand particle size is 200-700 μm;
the nano calcium carbonate particle size is 10-100 mm;
the reinforcing fiber is an ultra-high molecular weight polyethylene fiber, which is spun from polyethylene with a molecular weight of 1 million-5 million.

Preferably, a preparation method for the activator comprises the following steps:
mixing the NaOH solution with the $Na_2SiO_3$ solution, adjusting the modulus of the solution, and then adding the $Na_2CO_3$ solution to mix evenly to obtain the activator;
wherein, a concentration of NaOH solution is 14 mol/L;
the $Na_2SiO_3$ solution is purchased from Jiashan Yourui Refractory Co., Ltd., model SP50;
a mass ratio of $Na_2O$, $SiO_2$ and $H_2O$ in the $Na_2SiO_3$ solution is 29.99:13.75:56.26, and a solution modulus of sodium silicate is 2.25;

a mass percentage concentration of $Na_2SiO_3$ solution is 43.74%;

a mass concentration of $Na_2CO_3$ solution is 25%;

a modulus of the solution is 1.35-1.65.

A preparation method for a low carbon ultra-high performance engineered geopolymer composite comprises the following steps:

(1) after mixing uniformly the cementitious material powder, barium chloride, and defoaming agent, adding successively quartz sand, activator, water reducer, nano calcium carbonate and PE fiber and stirring uniformly to obtain a slurry;

(2) pouring and forming the obtained slurry and maintaining, then obtaining the low carbon ultra-high performance engineered geopolymer composite.

Preferably, step (1) specifically comprises the following steps:

adding the cementitious material powder, barium chloride, and defoaming agent to a stirrer, and dry mixing at a stirring rate of 75 r/min for 3 min, then adding the quartz sand to the stirrer and dry mixing at a low speed of 75 r/min for 3 min, then mixing the activator with water and adding to the stirrer to stir at a low speed of 75 r/min for 1 min, then stopping the machine and adding the water reducer and nano calcium carbonate to continue to stir at a stirring rate of 165 r/min for 2 min, then replacing with a low speed of 75 r/min and adding all PE fibers within 3 min, finally, dispersing uniformly the fibers under stirring at a low speed of 75 r/min for 2 min.

Beneficial effects: the addition order of different materials in this invention has an important influence on the fluidity of fresh UHP-EGC and the mechanical properties of UHP-EGC after hardening, wherein, the addition step of nano calcium carbonate is particularly important, and the forward and backward movement of the added node cannot meet the requirements of this invention.

Preferably, the maintenance in step (2) comprises the following steps:

covering the specimens with water-retaining film after pouring and forming, and maintaining at room temperature for 1 d, then demoulding and maintaining in water at room temperature for 28 d.

An application for a low carbon ultra-high performance engineered geopolymer composite in building materials.

Preferably, the building materials are building structure reinforcement materials or building structure seismic materials.

Compared with the prior art, the present invention has the following advantages and technical effects:

the activator in the present invention is composed of sodium hydroxide, sodium silicate solution, and sodium carbonate, sodium carbonate is added according to the equivalent $Na_2O$%, and sodium lignosulfonate (SLS) is used as a water reducer so that the product can improve the fluidity of geopolymer in a strong alkali environment; meanwhile, the present invention uses nano calcium carbonate to fill the pores of 50 nm, so as to reduce the shrinkage of UHP-EGC and improve the compactness of UHP-EGC to achieve the objective of improving mechanical properties; in addition, the ultra-high performance engineered geopolymer composite (UHP-EGC) provided by the present invention has a compressive strength of more than 120 MPa, a tensile strength of more than 9 MPa, a maximum ultimate tensile strain of more than 8%, and an initial setting time of 47 min, which has excellent mechanical properties and provides a new idea for the field of building materials.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the present invention and do not constitute an undue limitation of the present invention. In the drawings:

FIG. 8($b$) is a tensile strength of UHP-EGC obtained in embodiments 1-5; FIG. 8($c$) is an ultimate tensile strain of UHP-EGC obtained in embodiments 1-5; FIG. 8($d$) is a tensile strain energy of UHP-EGC obtained in embodiments 1-5

DETAILED DESCRIPTION OF THE EMBODIMENTS

Figure 1:
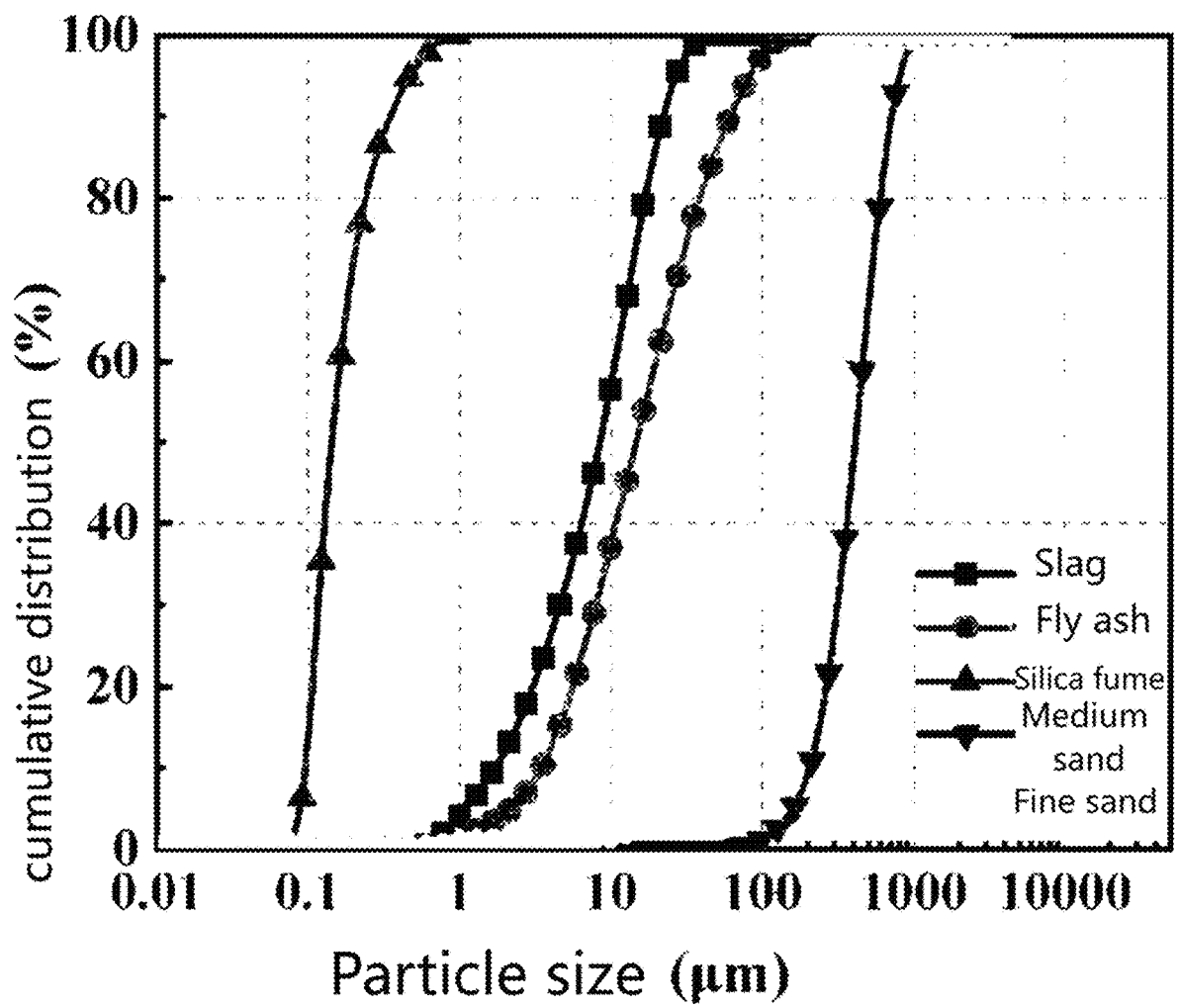
FIG. 1 is a particle size distribution of solid materials in the raw materials used in embodiment 1.

The technical scheme in the embodiments of the present invention will be described more clearly and completely hereinafter with reference to the accompanying drawings, apparently, the described embodiments are only some but not all of the embodiments of the present disclosure. All other embodiments obtained by those of ordinary skill in the art based on the embodiments of the present disclosure without involving any creative effort shall fall within the scope of protection of the present disclosure.

In order to make the objective, characteristics solution, and advantages of the present invention more obvious and easier to understand, the present invention will be further described in detail below with reference to accompanying drawings and detailed embodiments.

The raw materials in the embodiment of the present invention are obtained by purchasing from commercially available means;

wherein the mechanical properties of PE fiber are shown in Table 1:

TABLE 1

| Diameter (μm) | Length (mm) | Strength (MPa) | Elastic module (GPa) | Density (g/cm³) |
|---|---|---|---|---|
| 24 | 18 | 3000 | 116 | 0.97 |

The physical and chemical properties of S105 slag, class F fly ash, and silica fume are shown in Table 2:

TABLE 2

|  | S105 slag | Class F fly ash wt % | Silica fume |
|---|---|---|---|
| CaO | 34 | 4.01 | / |
| $SiO_2$ | 34.5 | 53.97 | 94.73 |
| $Al_2O_3$ | 17.7 | 31.15 | / |
| $SO_3$ | 1.64 | 2.2 | 0.2 |
| $Fe_2O_3$ | 1.03 | 4.16 | / |
| MgO | 6.01 | 1.01 | / |
| $TiO_2$ | / | 1.13 | / |
| Others | 5.12 | 2.37 | 5.07 |
| LOI(%) | 0.84 | 4.6 | 1.5 |
| density (g/cm³) | 3.1 | 2.3 | 2.25 |
| D10(μm) | 1.65 | 3.55 | 0.10 |
| D50(μm) | 8.68 | 14.46 | 0.14 |
| D90(μm) | 24.09 | 58.88 | 0.35 |

The ultra-high molecular weight polyethylene fiber is a fiber spun from polyethylene with a molecular weight of 1 million-5 million in the embodiment of the present invention.

The sodium silicate is purchased from Jiashan Yourui Refractory Co., Ltd., model SP50 in the embodiment of the present invention.

The low speed refers to the stirring rate of 75 r/min, and the high speed refers to the stirring rate of 165 r/min in the embodiment of the present invention.

Embodiment 1 a low carbon ultra-high performance engineered geopolymer composite, comprising the following parts by weight of raw materials:
cementitious material powder (S105 slag 821.1 parts, class F fly ash 248.9 parts, silica fume 93 parts) 1163 parts, fine aggregate (fine sand and medium sand are 346.0 parts and 61.1 parts, respectively, and the fine sand particle size is 40-200 μm, medium sand particle size is 200-700 m) 407.1 parts, admixture (barium chloride 0.01 parts, defoamer 0.001 parts, sodium lignosulfonate 0.005 parts) 18.6 parts, nano calcium carbonate (particle size 10-100 nm) 23.3 parts, reinforcing fiber (ultra-high molecular weight polyethylene fiber) 19.4 parts;
wherein, 932.2 parts of activator and 81.6 parts of water are also comprised;
the NaOH—$Na_2SiO_3$ activator is used as a basic activator, and $Na_2CO_3$ is used as a supplementary activator to form a low carbon composite activator;
the mass ratio of an equivalent $Na_2O$ in the activator to the cementitious material powder is 7%;
the mass ratio of the total mass of the solvent and water in the activator to a mass of the cementitious material powder is 0.3.

Figure 2:
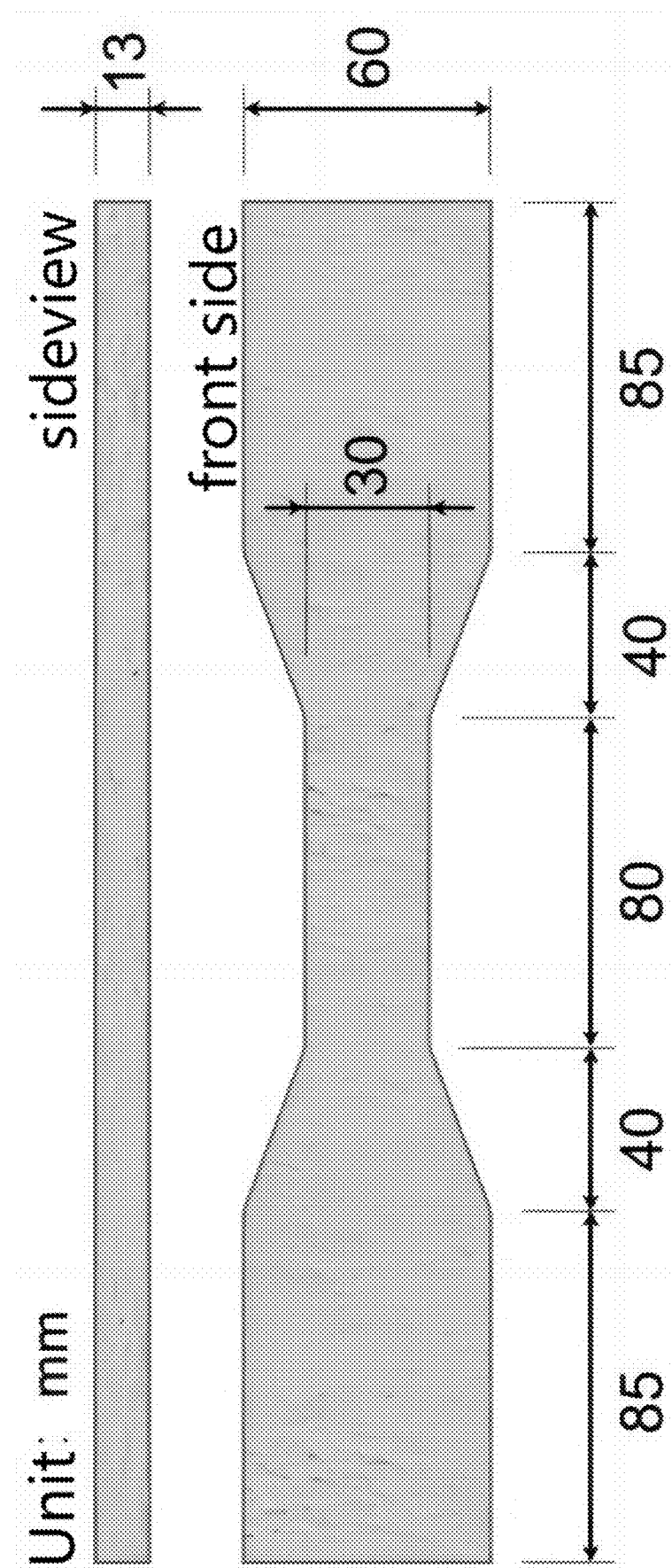
FIG. 2 is a size of a dumbbell-shaped specimen obtained from embodiment 1.
Figure 3:
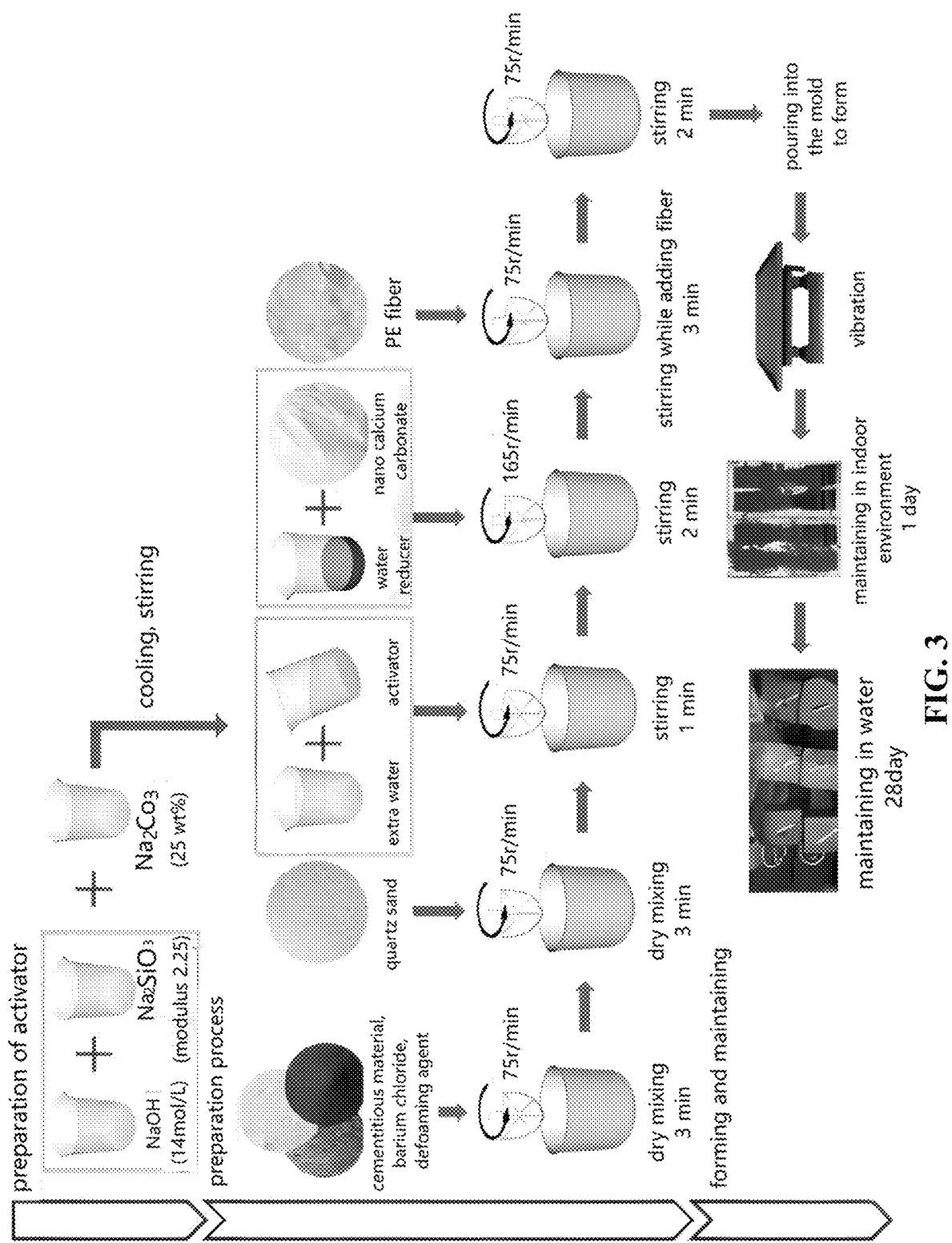
FIG. 3 is a preparation process flow chart of UHP-EGC in embodiment 1.

As shown in FIG. 3, a preparation method for a low carbon ultra-high performance engineered geopolymer composite comprises the following steps:
(1) firstly, the prepared and cooled to room temperature NaOH solution with a concentration of 14 mol/L is mixed with $Na_2SiO_3$ solution, the modulus of the solution is adjusted to 1.35, and the activator is obtained after the solution is cooled, wherein the mass ratio of sodium hydroxide solution, sodium silicate solution, and sodium carbonate solution is 111.5:354.6:0.0;
(2) the cementitious material powder is added to a stirrer and dry mixed at a low speed of 75 r/min for 3 min, then the quartz sand is added to the stirrer and dry mixed at a low speed of 75 r/min for 3 min, then the activator is mixed with water and is added to the stirrer to stir at a low speed for 1 min, then the machine is stopped and the water reducer and nano calcium carbonate are added to continue to stir at a high speed of 165 r/min for 2 min, then replaced with a low speed and all PE fibers are added within 3 min, finally, the fibers are dispersed uniformly under stirring at a low speed of 75 r/min for 2 min to obtain a slurry;
(3) the slurry obtained in step (2) is poured into the mold to form, and placed on the vibration table to expel bubbles and flatten the surface of the specimen, then the specimen is covered with a water-retaining film and maintained in the laboratory environment for Id, and then the specimen is demoulded and maintained in water at room temperature for 28 d, to obtain a dumbbell-shaped concrete specimen, and its size is shown in FIG. 2.

Embodiment 2 a low carbon ultra-high performance engineered geopolymer composite is different from embodiment 1 in that the amount of activator added is 475.9 parts and the amount of water added is 65.6 parts.

The preparation method for a low carbon ultra-high performance engineered geopolymer composite is different from embodiment 1 in that in step (1), after the solution is cooled, then 0.75$Na_2O$ % in 25% mass fraction of sodium carbonate solution is added, wherein, the mass ratio of sodium hydroxide solution, sodium silicate solution and sodium carbonate solution is 99.7:316.7:59.5.

Embodiment 3 a low carbon ultra-high performance engineered geopolymer composite is different from embodiment 1 in that the amount of activator added is 485.4 parts and the amount of water added is 49.7 parts.

The preparation method for a low carbon ultra-high performance engineered geopolymer composite is different from embodiment 1 in that in step (1), after the solution is cooled, then 1.5$Na_2O$ % in 25% mass fraction of sodium carbonate solution is added, wherein, the mass ratio of sodium hydroxide solution, sodium silicate solution and sodium carbonate solution is 87.6:278.7:119.1.

Embodiment 4 a low carbon ultra-high performance engineered geopolymer composite is different from embodiment 1 in that the amount of activator added is 487.2 parts and the amount of water added is 70.7 parts.

The preparation method for a low carbon ultra-high performance engineered geopolymer composite is different from embodiment 1 in that in step (1), the modulus of the solution is adjusted to 1.50, wherein, the mass ratio of sodium hydroxide solution, sodium silicate solution, and sodium carbonate solution is 93.2:394.0:0.0.

Embodiment 5 a low carbon ultra-high performance engineered geopolymer composite is different from embodiment 1 in that the amount of activator added is 508.1 parts and the amount of water added is 59.8 parts.

The preparation method for a low carbon ultra-high performance engineered geopolymer composite is different from embodiment 1 in that in step (1), the modulus of the solution is adjusted to 1.65, wherein, the mass ratio of sodium hydroxide solution, sodium silicate solution, and sodium carbonate solution is 74.6:433.5:0.0.

Comparative Embodiment 1 a preparation method for a low carbon ultra-high performance engineered geopolymer is different from embodiment 1 in that in step (2), the addition order of nano calcium carbonate is changed, which comprises the following steps:

(2) the cementitious material powder is added to a stirrer and dry mixed at a low speed of 75 r/min for 3 min, then the quartz sand and nano calcium carbonate are added to the stirrer and dry mixed at a low speed of 75 r/min for 3 min, then the activator is mixed with water and is added to the stirrer to stir at a low speed for 1 min, then the machine is stopped and the water reducer is added to continue to stir at a high speed of 165 r/min for 2 min, then replaced with a low speed and all PE fibers are added within 3 min, finally, the fibers are dispersed uniformly under stirring at a low speed of 75 r/min for 2 min to obtain a slurry.

Comparative Embodiment 2 a preparation method for a low carbon ultra-high performance engineered geopolymer is different from embodiment 1 in that in step (2), the addition order of nano calcium carbonate is changed, which comprises the following steps:

(2) the cementitious material powder is added to a stirrer and dry mixed at a low speed of 75 r/min for 3 min, then the quartz sand is added to the stirrer and dry mixed at a low speed of 75 r/min for 3 min, then the activator is mixed with water and is added to the stirrer to stir at a low speed for 1 min, then the machine is stopped and the water reducer is added to continue to stir at a high speed of 165 r/min for 2 min, then replaced with a low speed and all PE fibers and nano calcium carbonate are added within 3 min, finally, the fibers are dispersed uniformly under stirring at a low speed for 2 min to obtain a slurry.

Technical Effect

Figure 4:
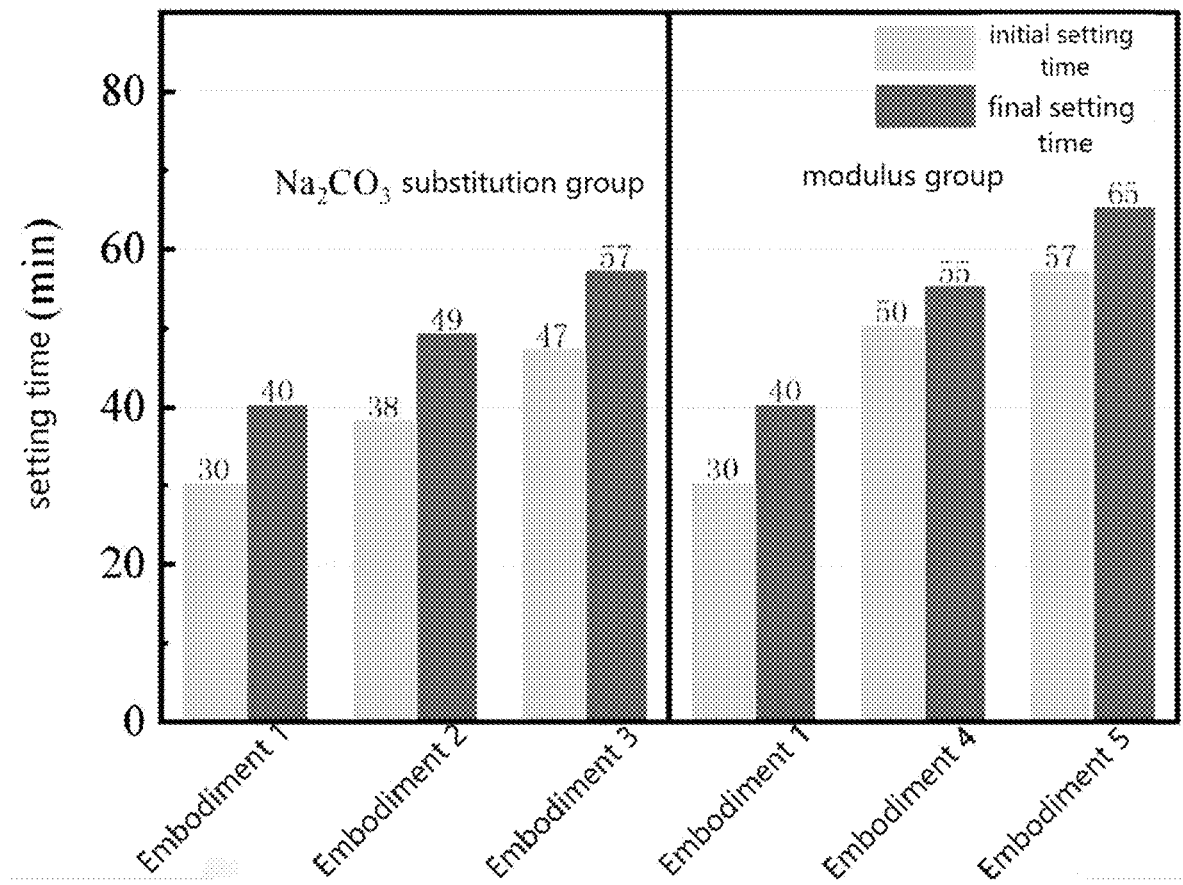
FIG. 4 is a setting time of a slurry obtained from step (2) in embodiments 1-5.

1. Setting time:

FIG. 4 is the setting time of the slurry obtained in step (2) of embodiments 1-5. It can be seen from FIG. 4 that the initial setting time and final setting time of geopolymer slurry increase with the increase of $Na_2CO_3$ substitution. When the $Na_2CO_3$ substitution is 1.5$Na_2O$ %, the initial setting time and final setting time of embodiment 3 are 47 min and 57 min, respectively, which are 56.7% and 42.5% higher than that of embodiment 1, respectively, this may be due to the replacement of $Na_2CO_3$ with $Na_2SiO_3$, which reduces the pH value of the geopolymer liquid phase, delays the dissolution of Ca, Si, Al and other elements in the cementitious material powder, and the reduction of $[SiO_4]^{4-}$ also delays the formation of three-dimensional network cementitious structure. In addition, it can be seen from FIG. 5 that increasing the modulus of the activator solution can also effectively delay the condensation of the slurry. The initial setting time and final setting time of embodiment 5 with a solution modulus of 1.65 reached 57 min and 65 min, respectively. However, although the increase of the solution modulus prolonged the initial setting time, the time interval between the final setting and the initial setting is reduced, this may be due to the fact that although increasing the modulus is as effective as using $Na_2CO_3$ to reduce the pH value of the geopolymer liquid phase, thereby delaying the initial setting. However, due to the increase of $[SiO_4]^{4-}$ content, the dissolved cations are rapidly combined to form a three-dimensional network cementitious precipitate, which reduces the time interval between the initial setting and the final setting. The setting time of comparative embodiment 1 and comparative embodiment 2 is the same as that of embodiment 1, and the addition order of nano calcium carbonate has no effect on the setting time.

2. Compression test

The compression test is carried out according to ASTM C109/C109M (2020), the compression is loaded by force controlled, and the loading speed is at a rate of 1.75 kN/s.

Figure 5:
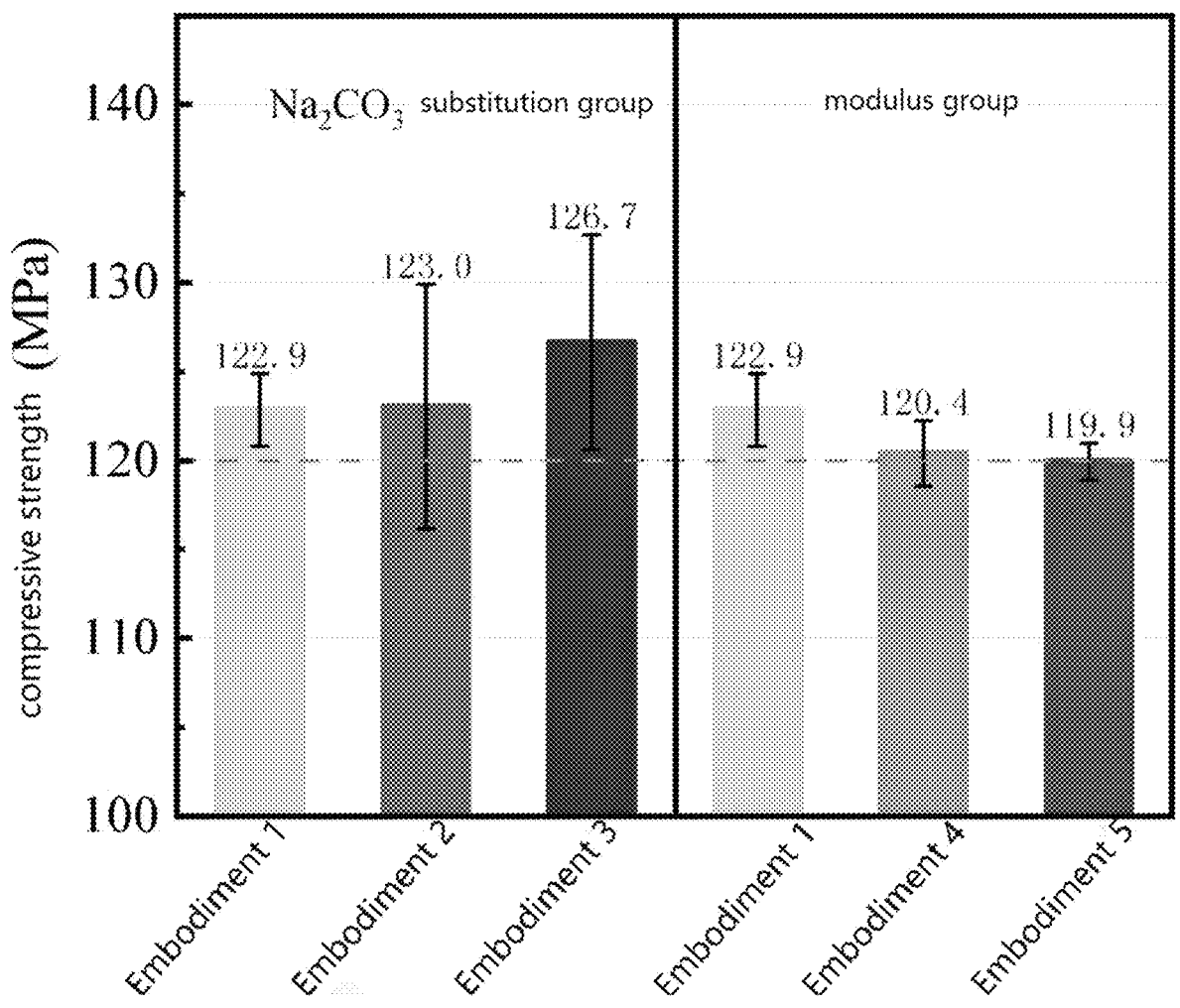
FIG. 5 is a compressive strength of UHP-EGC obtained in embodiment 1-5.

FIG. 5 shows the compressive strength of UHP-EGC with different $Na_2CO_3$ substitution and different activator modulus. The Si/Al and Ca/(Si+Al) in the invention are 2.27-2.46 and 0.34-0.36, respectively, and the compressive strength reaches more than 120 MPa. It is worth noting that a certain amount of $Na_2CO_3$ substitution reduced the alkalinity of the activator, but increased the compressive strength of UHP-EGC (from 122.9 MPa to 126.7 MPa). This is mainly because the cluster structure formed by a certain amount of sodium carbonate substitution optimizes the particle size distribution of fresh geopolymer slurry, improves the compactness of geopolymer slurry, and thus improves the compressive strength. Similarly, it can be seen from FIG. 5 that with the increase of the modulus of the activator, the compressive strength of UHP-EGC decreases, which is also caused by the decrease of the density of fresh geopolymer slurry caused by the increase of the modulus of the activator. The compressive strength of the comparative embodiment 1 and comparative embodiment 2 is reduced by 10 MPa and 5 MPa respectively compared with the embodiment 1, and the addition order of nano calcium carbonate has a significant effect on the compressive strength.

3. Tensile test

The tensile test is carried out according to JC/T2461 (2018), two linear variable differential transformers (LVDTs) are arranged on both sides of the specimen through the fixture to obtain the deformation in the measurement area of the tensile specimen, the tensile test uses the displacement control method to load at a speed of 0.5 mm/min.

Figure 6:
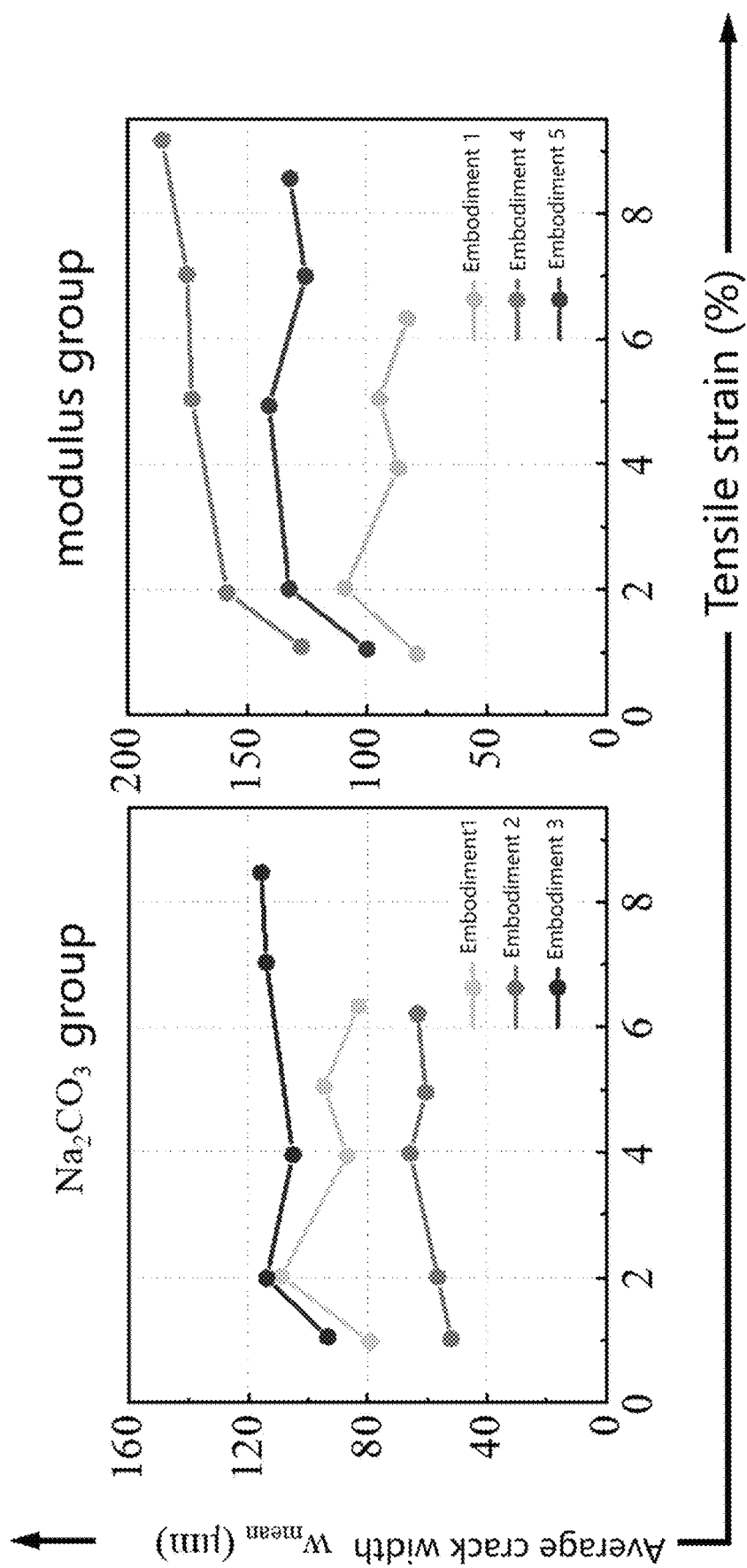
FIG. 6 is an average change of crack width of UHP-EGC obtained in embodiment 1-5.

(1) FIG. 6 shows the average change of crack width of UHP-EGC under different $Na_2CO_3$ substitution and different activator modulus. With the increase of $Na_2CO_3$ substitution, the crack width of UHP-EGC decreases first and then increases under the same tensile strain. In the tensile process, the maximum average crack width of embodiment 2 is only 65.78 μm, which is much lower than that of the other two groups. This indicates that a certain amount of $Na_2CO_3$ substitution helps to reduce the crack width. However, when the amount of $Na_2CO_3$ substitution increases to 1.5$Na_2O$ %, the average crack width of UHP-EGC (embodiment 3) increases, which is about 100 m to 120 m. This indicates that excessive $Na_2CO_3$ substitution will reduce the crack control capability of UHP-EGC. With the increase of the modulus of the activator, the average crack width of UHP-EGC exceeds 100 m. In particular, the average crack width of embodiment 4 reached 185.68 μm in the limit state. It can be seen that it is not conducive to the control of crack width under the condition of high activator modulus. The crack width of comparative embodiment 1 and comparative embodiment 2 increased by 12% and 7% respectively compared with that of embodiment 1, the addition order of nano calcium carbonate significantly effected the fiber-matrix interface performance, reduced the crack control capability, and increased the crack width.

Figure 7:
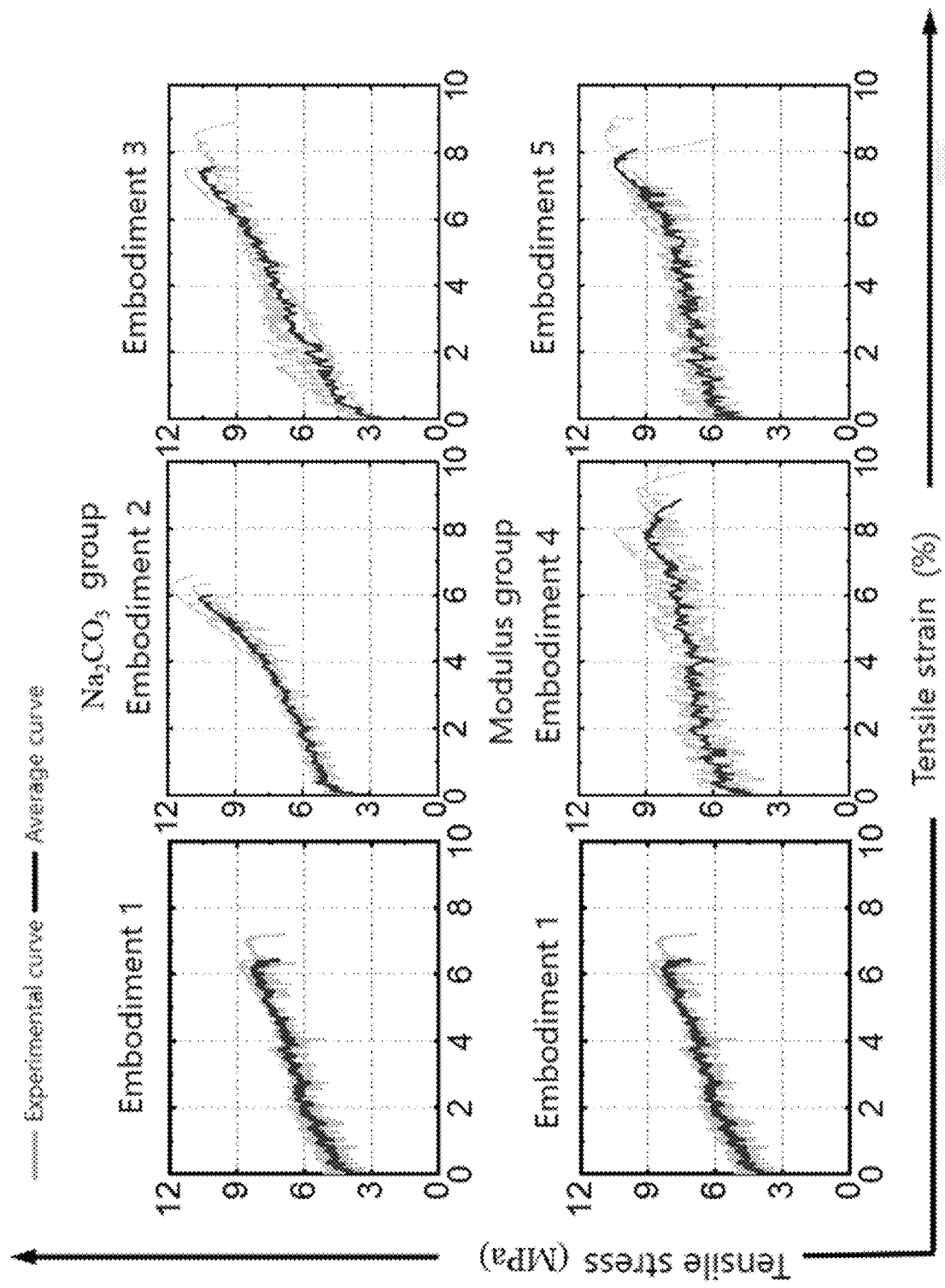
FIG. 7 is a tensile stress-strain curve of UHP-EGC obtained in embodiment 1-5.

(2) FIG. 7 shows the tensile stress-strain curves of UHP-EGC under different $Na_2CO_3$ substitution and different activator modulus. It can be seen from FIG. 7 that the change of $Na_2CO_3$ substitution amount and activator modulus has a significant effect on the stress fluctuation, initial crack strength, tensile strength, and ultimate tensile strain of UHP-EGC during the strain hardening stage. It can be seen from FIG. 7 that in the strain hardening stage, UHP-EGC has the behavior of stress fluctuation, the stress fluctuation is mainly caused by the stress redistribution process that the continuous initiation and stable development of UHP-EGC cracks with the increase of tensile deformation. For UHP-EGC with different $Na_2CO_3$ substitutions, the stress fluctuation amplitude of the strain hardening state in embodiment 2 is the smallest, it can be seen that the fiber bridging effect is the best when the crack is initiated in embodiment 2 under tensile load, which is consistent with the observed minimum average crack width in embodiment 2. Increasing the modulus of the activator has the opposite effect on the stress fluctuation and crack control capability during the tensile strain hardening process of UHP-EGC.

Figure 8:
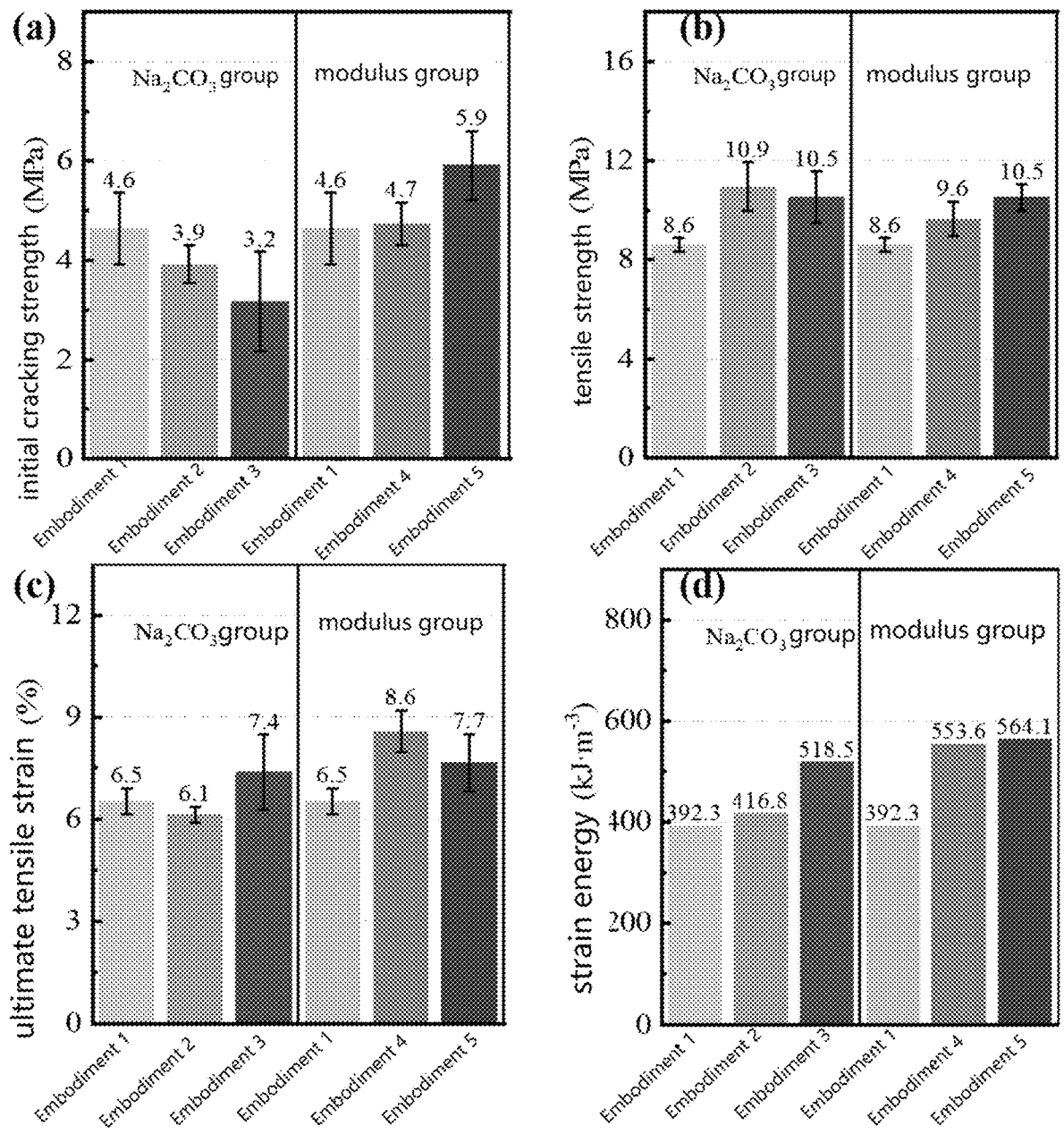
FIG. 8 is an initial crack strength, a tensile strength, an ultimate tensile strain, and a tensile strain energy of UHP-EGC obtained in embodiments 1-5; wherein, FIG. 8($a$) is an initial crack strength of UHP-EGC obtained in embodiments 1-5.

(3) FIG. 8 shows the initial crack strength, tensile strength, ultimate tensile strain, and tensile strain energy of UHP-EGC under different $Na_2CO_3$ substitution and different activator modulus. It can be seen from part a in FIG. 8 that the addition of $Na_2CO_3$ significantly reduced the initial crack strength of UHP-EGC. The initial crack strength of embodiment 3 is 3.17 MPa, which is 31.7% lower than that of embodiment 1. On the contrary, in the Modulus Series, the initial crack strength increases with the increase of modulus. Especially when the modulus is 1.65, the initial crack strength of embodiment 5 is 5.92 MPa, which is 27.6% higher than that of embodiment 1. According to ECC design criteria, complementary energy ($J'_b$) higher than matrix fracture energy ($J_{tip}$) is one of the prerequisites for ECC to have the capability of steady-state cracking, and the larger the pseudo-strain hardening coefficient (PSH) (i.e., $J'_b/J_{tip}$), the more saturated the crack distribution. The higher initial fracture strength indicates that the matrix has higher fracture toughness. Therefore, for embodiment 2 with $Na_2CO_3$ substitution of $0.75Na_2O$ %, the reduced initial fracture strength makes it show a more saturated fracture distribution than embodiment 1. However, although the initial crack strength of UHP-EGC (embodiment 3) continues to decrease with the further increase of $Na_2CO_3$ substitution, the excessive $Na_2CO_3$ substitution will reduce the bridging effect between the fiber and the matrix, thus reducing the crack control capability of UHP-EGC (manifested as less crack number and larger crack width). For the Modulus Series, the increase of initial crack strength significantly reduces the saturated cracking behavior of UHP-EGC, and the number of cracks is significantly reduced. The initial crack strength of the comparative embodiment 1 and comparative embodiment 2 is reduced by 1.3 MPa and 1.0 MPa respectively compared with that of the embodiment 1, the addition order of nano calcium carbonate effects the density of the matrix, thereby reducing the initial crack performance.

It can be seen from the part b in FIG. 8 that the tensile strength of UHP-EGC exceeds 8 MPa, and the use of $Na_2CO_3$ has a positive effect on the tensile strength. The tensile strength of embodiments 2 and 3 is more than 10 MPa, which is 27.2% and 22.2% higher than that of embodiment 1, respectively. The tensile strength of the comparative embodiment 1 and comparative embodiment 2 is reduced by 2.0 MPa and 1.1 MPa, respectively compared with that of embodiment 1, the addition order of nano calcium carbonate effected the fiber bonding performance, resulting in a decrease in the fiber bridging capability in the limit state, thereby reducing the tensile strength.

It can be seen from the part c in FIG. 8 that the substitution amount of $Na_2CO_3$ is $0.75Na_2O$ %, the crack control capability of UHP-EGC is improved, but the overall deformation capability is limited, and the ultimate tensile strain of embodiment 2 is only 6.13%. Although increasing the modulus of the activator reduces the crack control capability, the embodiment 4 shows the highest deformation capability, and the ultimate tensile strain reaches 8.58%, which is 31.6% higher than the embodiment 1. The ultimate tensile strain of comparative embodiment 1 and comparative embodiment 2 is reduced to 4.8% and 5.9% respectively compared with that of embodiment 1, and the addition order of nano calcium carbonate has a significant effect on the tensile deformation capability.

It can be seen from the part d in FIG. 8 that in $Na_2CO_3$ Series, the ultimate tensile strain of embodiment 2 is close to that of embodiment 1, and its strain energy is only 416.8 kJ m$^{-3}$, which is only 6.2% higher than that of embodiment 1. However, when the substitution amount of $Na_2CO_3$ is $1.5Na_2O$ %, the strain energy of embodiment 3 is significantly increased to 518.5 kJ m$^{-3}$, which is 32.2% higher than that of embodiment 1. In addition, it can be seen from the Modulus Series that increasing the modulus of the activator significantly improves the energy dissipation capacity of UHP-EGC. Embodiment 4 and embodiment 5 increase the strain energy due to the increase of deformation capacity. The strain energy of embodiment 5 reaches 564.1 kJ m$^{-3}$, which is 43.8% higher than that of embodiment 1. The addition of $Na_2CO_3$ reduces the initial crack strength but is beneficial to the tensile strength, while increasing the modulus of the activator increases the initial crack strength but reduces the crack control ability.

Proper adjustment of these parameters can optimize the cracking behavior and tensile properties of UHP-EGC. The strain energy of comparative embodiment 1 and comparative embodiment 2 is reduced by 18% and 13% respectively compared with that of embodiment 1, the initial crack strength, tensile strength, and tensile deformation capability are significantly reduced by changing the addition order of nano calcium carbonate, so the strain energy (i.e., the envelope area of the tensile curve) is relatively reduced.

4. Carbon emission

The use of $Na_2CO_3$ greatly reduces the amount of $Na_2SiO_3$ solution and NaOH, which is of great significance for reducing the carbon footprint of geopolymer concrete materials. In order to quantify the influence of the change of activator on the environmental performance of UHP-EGC, the environmental performance of UHP-EGC is comprehensively discussed by considering the tensile properties and carbon emissions. Table 3 shows the carbon emission factor of UHP-EGC and the total carbon emission per unit volume of concrete. It should be noted that the carbon emission factor of raw materials only considers the carbon emissions generated in the production process. Therefore, the carbon emission factor of the $Na_2SiO_3$ solution is set to 1.222 kg $CO_2$-e/kg.

TABLE 3

| Materials | Emission coefficient (kg $CO_2$-e/kg) | Mix ID | | | | |
|---|---|---|---|---|---|---|
| | | Embodiment 1 | Embodiment 2 | Embodiment 3 | Embodiment 4 | Embodiment 5 |
| S105 slag | 0.019 | 15.58 | 15.58 | 15.58 | 15.58 | 15.58 |
| Class F fly ash | 0.009 | 2.237 | 2.237 | 2.237 | 2.237 | 2.237 |
| Silica fume | 0 | 0 | 0 | 0 | 0 | 0 |
| NaOH | 1.915 | 83.96 | 75.27 | 66.32 | 69.83 | 55.61 |
| $Na_2SiO_3$ | 1.222 | 433.3 | 388.1 | 342.5 | 479.2 | 524.8 |
| $Na_2CO_3$ | 0.111 | / | 1.657 | 3.325 | / | / |
| Quartz sand | 0.01 | 4.066 | 4.066 | 4.066 | 4.066 | 4.066 |
| Ultra-high molecular weight polyethylene fiber | 2 | 38.80 | 38.80 | 38.80 | 38.80 | 38.80 |
| $CO_2$-e (kg $CO_2$-e/m$^3$) | / | 578.0 | 525.7 | 472.9 | 609.7 | 641.1 |

Figure 9:
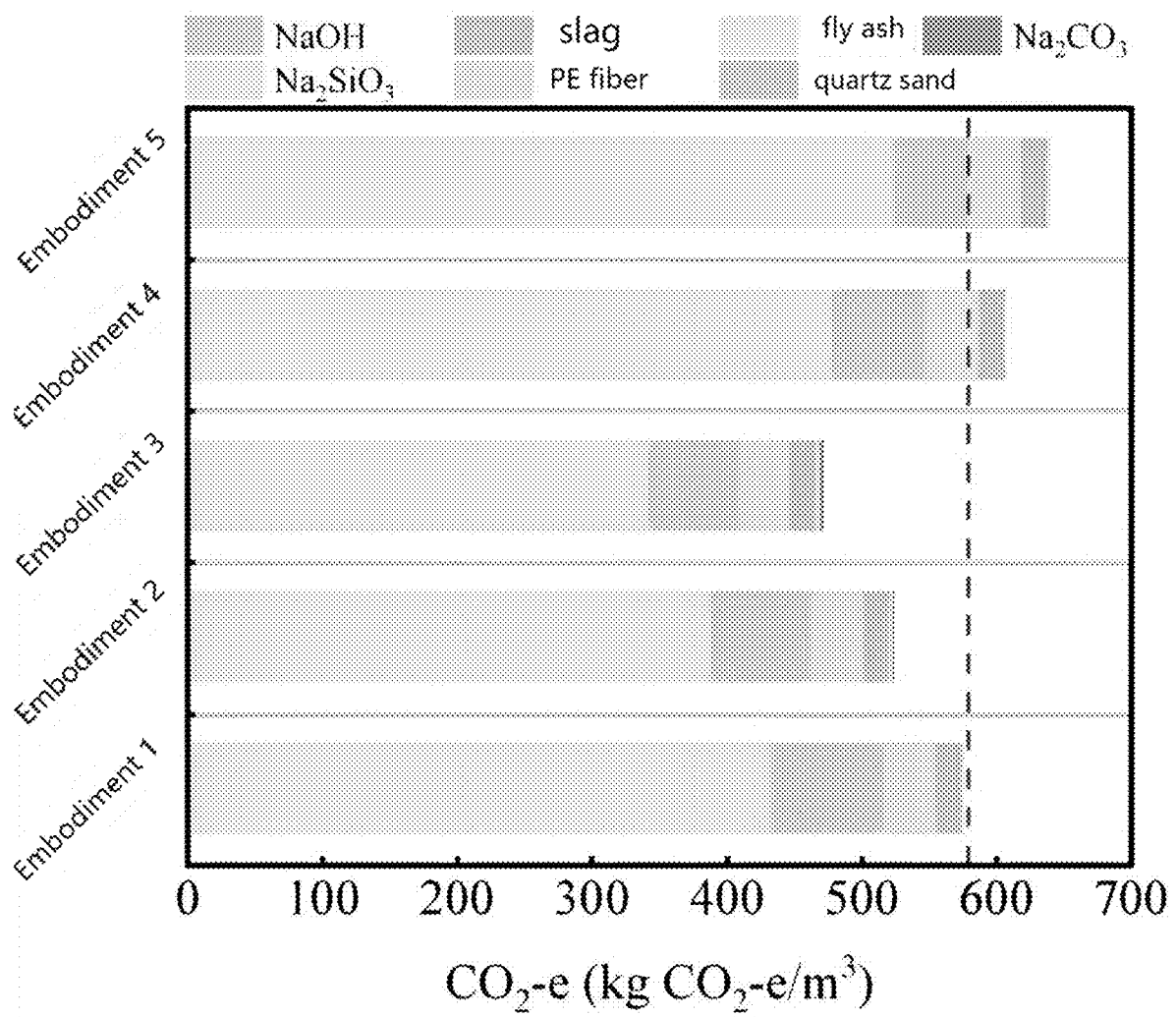
FIG. 9 is a total carbon emission and a carbon emission composition per cubic meter of UHP-EGC obtained in embodiment 1-5.

FIG. 9 shows the carbon emissions of each raw material per cubic meter of UHP-EGC obtained from embodiments 1-5. FIG. 9 indicates that the carbon emissions of the activator account for the first place in the carbon emissions of UHP-EGC raw materials, about more than 87%. In embodiment 1, $Na_2SiO_3$ accounted for 75.0% of the total carbon emissions, while the carbon emissions of NaOH—$Na_2SiO_3$ activator accounted for 89.5%. The $CO_2$-e of embodiment 1 reached 578.0 kg $CO_2$-e/m$^3$, and the carbon emission of UHP-EGC is significantly reduced by replacing some activators with $Na_2CO_3$, and the carbon emission of embodiment 3 is 18.2% lower than that of embodiment 1. On the other hand, increasing the modulus of the activator means that the amount of $Na_2SiO_3$ needs to be increased, which leads to an increase in carbon emissions. When the modulus of the activator is increased to 1.65, the $CO_2$-e of embodiment 4 reaches 641.1 kg $CO_2$-e/m$^3$, an increase of 10.9%. The carbon emissions of comparative embodiment 1 and comparative embodiment 2 are the same as those of embodiment 1, and the addition order of nano calcium carbonate has no effect on carbon emissions.

5. Nano calcium carbonate is used to fill the pores, too early or too late to join will lead to a decrease in mechanical properties. Compared with embodiment 1, the compressive strength of the comparative embodiment 1 and comparative embodiment 2 decreased by 5-10 MPa, the crack width increased by 7%-12%, the initial crack strength decreased by 1-1.3 MPa, the tensile strength decreased by about 1.1-2.0 MPa, the tensile strain decreased to 4.8% and 5.9%, and the strain energy decreased by 13%-18%, but the setting time and carbon emission are not effected.

The above is only the preferred embodiments of this application, rather than limiting the same, any modified or equivalently replaced that can be easily appreciated by technical personnel familiar with this technical field within the technical scope disclosed in this application should be covered within the scope of protection of this application. Therefore, the scope of protection of this application should be based on the scope of protection of the claim.

What is claimed is:

1. A preparation method for an ultra-high performance engineered geopolymer composite, wherein the composite comprises the following parts by weight of raw materials:

cementitious material powder 1163 parts, fine aggregate 407.1 parts, admixture 18.6 parts, nano calcium carbonate 23.3 parts, reinforcing fiber 19.4 parts, activator 475.9-932.2 parts, and water 49.7-81.6 parts;

the cementitious material powder comprises the following parts by weight of raw material: slag 821.1 parts, fly ash 248.9 parts, and silica fume 93.0 parts;

the admixture comprises the following parts by weight of raw materials: barium chloride 11.6 parts, defoaming agent 1.2 parts, and water reducer 5.8 parts;

the fine aggregate is quartz sand;

the activator used is a NaOH—$Na_2SiO_3$ activator as a basic activator, and $Na_2CO_3$ is used as a supplementary activator to form a composite activator, wherein, a mass ratio of NaOH solution, $Na_2SiO_3$ solution, and $Na_2CO_3$ solution is (74.6:111.5):(0-119.1):(278.7-433.5); the reinforcing fiber is an ultra-high molecular weight polyethylene (PE) fiber;

and the method comprises the following steps:

(1) after mixing uniformly the cementitious material powder, barium chloride, and defoaming agent, adding successively quartz sand, activator, water reducer, nano calcium carbonate and PE fiber and stirring uniformly to obtain a slurry;

(2) pouring and forming the obtained slurry and maintaining, then obtaining an ultra-high performance engineered geopolymer composite;

step (1) comprises the following steps:

adding the cementitious material powder, barium chloride, and defoaming agent to a stirrer, and dry mixing at a stirrer rate of 75 r/min for 3 min, then adding the quartz sand to the stirrer and dry mixing at a low speed of 75 r/min for 3 min, then mixing the activator with water and adding to the stirrer to stir at a low speed of 75 r/min for 1 min, then stopping the stirrer and adding the water reducer and nano calcium carbonate to continue to stir at a stirring rate of 165 r/min for 2 min, then replacing with a low speed of 75 r/min and adding all PE fibers within 3 min, finally, dispersing uniformly the fibers under stirring at a low speed of 75 r/min for 2 min.

2. The preparation method for an ultra-high performance engineered geopolymer composite according to claim 1, the quartz sand comprises fine sand and medium sand, wherein, the fine sand and medium sand are 346.0 parts and 61.1 parts respectively;

the fine sand particle size is 40-200 μm, and the medium sand particle size is 200-700 μm.

3. The preparation method for an ultra-high performance engineered geopolymer composite according to claim 1, the nano calcium carbonate particle size is 10-100 nm.

4. The preparation method for an ultra-high performance engineered geopolymer composite according to claim 1, a preparation method for the activator comprises the following steps:

mixing the NaOH solution with the $Na_2SiO_3$ solution, adjusting the modulus of the NaOH and $Na_2SiO_3$ solution, and then adding the $Na_2CO_3$ solution to mix evenly to obtain the activator;

a concentration of NaOH solution is 14 mol/L;

a mass concentration of $Na_2CO_3$ solution is 25%;

a modulus of the adjusted solution is adjusted to 1.35-1.65.

* * * * *